July 15, 1958

K. SCHWABE 2,843,157

BRAKE TONGUES FOR THE COMPARTMENTS OF
SHUTTLE BOXES IN LOOMS

Filed June 22, 1956

INVENTOR.
KURT SCHWABE

BY

Attorneys

United States Patent Office 2,843,157
Patented July 15, 1958

2,843,157

BRAKE TONGUES FOR THE COMPARTMENTS OF SHUTTLE BOXES IN LOOMS

Kurt Schwabe, Le Locle, Switzerland, assignor to Tissomat A. G., Glarus, Switzerland Application June 22, 1956, Serial No. 593,255

Claims priority, application Switzerland June 24, 1955

17 Claims. (Cl. 139—185)

The invention relates to brakes for use in the compartments of shuttle boxes in looms.

In looms it is known to use shuttle boxes the compartments of which, being open on one side, are provided with a spring-loaded brake tongue. The known brake tongues in the compartments of these shuttle boxes involve the disadvantage that the shuttle is stopped sharply, and almost abruptly, in the compartment of the shuttle box which, apart from the considerable noise, also causes a considerable expenditure in or wear and tear of shuttles and brake tongues. Even a mere braking of the shuttle involves a great deal of noise and is in many cases either too sharp or insufficient.

It is an object of the invention to provide means whereby such disadvantages may be avoided or reduced to a considerable extent.

The invention provides a brake tongue for the shuttle box or boxes in a loom, comprising a channel or grooved member one end of which carries a bearing boss and in which is mounted a compressible cushion which projects into the compartment of the shuttle box.

When the loom has a shuttle box provided with several compartments, a brake tongue is provided for each compartment of the shuttle box.

One construction of the brake according to the invention is diagrammatically illustrated by way of example in the accompanying drawings, in which.

Figure 1:
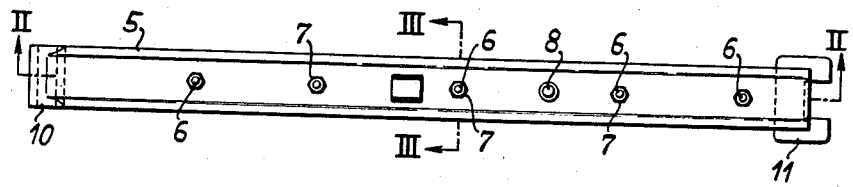
Figure 1 shows a rear view of the brake tongue for one of the compartments of the shuttle box of a loom.
Figure 2:
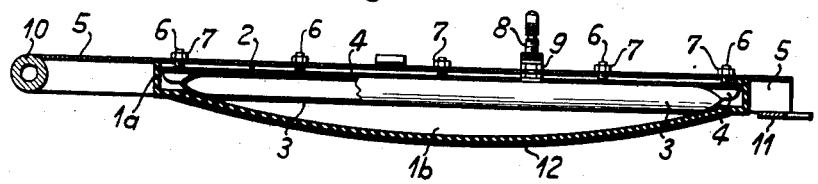
Figure 2 is a section on the line II—II of Figure 1.
Figure 3:
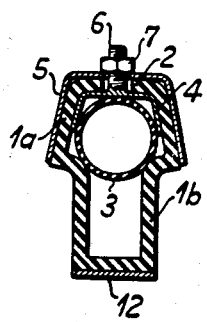
Figure 3 is a section on the line III—III of Figure 1, on an enlarged scale.

The brake tongue illustrated in the drawings and provided for a compartment of the shuttle box of an automatic loom, comprises a hollow member of natural or synthetic rubber having a wide rear portion 1a and a narrow front portion 1b. The rear portion 1a of the hollow rubber member is formed with a central slit or slot 2 which extends substantially over the entire length of the member. In the hollow rubber member are mounted an air tube 3 which is closed at both ends, and a rail or bar 4 of channel or grooved section which extends in the direction of the slot 2 of the rear portion 1a and in which the air tube 3 is disposed. The rear portion 1a of the hollow rubber member is inserted in a channel member 5. Screw-threaded bolts 6 are securely mounted in and distributed over the length of the rail or bar 4 to extend through the slot 2 in the rear portion 1a of the hollow rubber body and through registering holes provided in the member 5. The bolts 6 are, externally of the member 5, in threaded engagement with nuts 7 so that the edges of the rear portion 1a of the hollow rubber member are securely clamped in position between the rail 4 and the channel member 5. The air tube 3 is provided with a check or relief valve 8 having a threaded shaft which extends through the slit 2 in the rear portion 1a of the hollow rubber body and a hole provided in the member 5 and which is held in position by a nut 9 which, externally of the member 5, is in threaded engagement with the valve stem. One end of the member 5 carries a bearing boss 10 by which the rail or member 5 is pivotally connected to an intermediate member, not shown in the drawings, which is operated in known manner or otherwise by the bobbin exchange mechanism of the loom. The other end of the member 5 is secured, for example by welding, to a plate 11 on which a lever which is mounted on the stop rod shaft (not shown in the drawings) may act.

The air tube 3 is inflated to the desired pressure. When the member 5 bears against the shuttle box, the front portion 1b of the hollow rubber member which has the shape of a circular segment, projects into the open side of the shuttle box compartment so as to form a bulge. When a shuttle enters the shuttle box compartment, it strikes laterally against the front portion 1b of the hollow rubber member and is thus stopped. The braking of the shuttle does not proceed sharply and abruptly, but gently and almost silently, inasmuch as the front portion 1b of the hollow rubber member is compressible. When the shuttle strikes against the front portion 1b of the hollow rubber member, a comparatively large area of contact is formed between the shuttle and the front part 1b by virtue of the fact that the front portion 1b is compressible, which is of substantial advantage for the braking of the shuttle.

The front portion 1b of the hollow rubber member is advantageously covered with a wear-resistant coating 12, for example of a jute fabric or canvas, to increase friction.

I claim:

1. A shuttle brake for a loom, comprising a channel member provided at one end with means for pivotally mounting the channel member, a hollow member made of a flexible, resilient material and having a rear portion of greater width than its front portion, the rear portion of the hollow member being provided with a centrally disposed, longitudinal slit and being seated in the channel member, a clamping member disposed within the hollow member, means securing the said clamping member to the said channel member to retain part at least of the rear portion of the hollow member in a gas-tight manner between the said clamping member and the said channel member, a closed flexible tube disposed within the hollow member, a valve on the said tube, the stem of said valve extending through the longitudinal slit in the said hollow member and through the said channel member whereby its nozzle is disposed externally of the channel, and means for securing the said stem in the said channel member.

2. A shuttle brake according to claim 1, in which the said hollow member is made of rubber.

3. A shuttle brake according to claim 1, in which the means securing the clamping member to the channel member comprise a number of threaded bolts integral with the clamping member and extending through the longitudinal slit in the hollow member, the channel member being provided with a series of holes in register with the threaded bolts, and nuts disposed externally of the channel member and in threaded engagement with the said bolts.

4. A shuttle brake according to claim 1, in which the front portion of the hollow member is provided with a covering of a material having a high coefficient of friction.

5. A shuttle brake according to claim 1, in which part at least of the front portion of the hollow member is provided with a covering of a material resistant to wear.

6. A shuttle brake according to claim 1, in which part at least of the front portion of the hollow member is provided with a covering of a fabric comprising woven jute.

7. A shuttle brake according to claim 1, in which the clamping member is provided in the form of a trough.

8. A shuttle brake according to claim 7, in which part at least of the said tube is disposed within the clamping member.

9. A shuttle brake for a loom, comprising a channel member, a hollow member made of a resilient, flexible material and having a rear portion of greater width than its front portion, the rear portion of the hollow member being seated in the channel member and the depth of the hollow member varying along its length in such manner that the hollow member in longitudinal section presents a front, braking face substantially in the form of an arc, a clamping member disposed within the hollow member, means securing the clamping member to the channel member to retain the hollow member in the channel member, a closed air tube within the hollow member, and a valve on the air tube, said valve extending to a position outside the channel member.

10. A shuttle brake for a loom comprising a channel member, means at one end of the channel member for pivotally mounting it adjacent a shuttle box, a closed hollow member of resilient material mounted in the channel member and having an arcuate portion projecting from the channel member into the shuttle box to form a braking surface for a shuttle delivered to the box, an air tube inside the hollow member and extending substantially from end to end thereof, and a valve connected with the air tube for supplying air thereto under pressure.

11. A shuttle brake according to claim 10 in which the said hollow member is fitted closely inside the channel member and is affixed thereto.

12. A shuttle brake according to claim 11 in which there is a rigid clamping member inside the said hollow member and which rigid clamping member is secured to the channel member to attach the hollow member thereto, and the said valve for the air tube extending through the back of the channel member.

13. A shuttle brake for a loom having a shuttle box comprising a channel member adapted for being pivotally mounted adjacent the shuttle box, a hollow compressible and resilient member mounted in the channel and having a portion thereof projecting into the shuttle box to provide a braking surface for the shuttle, said portion being arcuate in longitudinal section, and a flexible tube mounted within the said hollow member, said tube being provided with a valve extending to a position outside the channel member for a supply of gas to the tube under pressure.

14. A shuttle brake according to claim 13, in which the hollow member is provided with a rear portion which is wider than the front portion of the hollow member, the rear portion being seated within the channel member.

15. A shuttle brake according to claim 13, including a trough-like clamping member within the hollow member, threaded bolts integral with said clamping member, said threaded bolts passing through holes provided in the base of the channel, nuts in threaded engagement with the threaded bolts to secure the hollow member in a gas-tight manner in the channel member.

16. A shuttle brake according to claim 15, in which the hollow member is provided with a longitudinal slot through which said threaded bolts pass.

17. A shuttle brake according to claim 13, including a wear-resistant material secured to the outer surface of the front face of the front portion of the hollow member.

References Cited in the file of this patent

UNITED STATES PATENTS

| | | |
|---|---|---|
| 820,663 | Mills | May 15, 1906 |
| 2,527,066 | Kennedy | Oct. 24, 1950 |
| 2,736,340 | Selles | Feb. 28, 1956 |